US010719995B2

(12) United States Patent
Goslin

(10) Patent No.: US 10,719,995 B2
(45) Date of Patent: Jul. 21, 2020

(54) DISTORTED VIEW AUGMENTED REALITY

(71) Applicant: Disney Enterprises, Inc., Burbank, CA (US)

(72) Inventor: Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/168,546

(22) Filed: Oct. 23, 2018

(65) Prior Publication Data

US 2020/0126313 A1    Apr. 23, 2020

(51) Int. Cl.
*G06T 19/20*    (2011.01)
*G01B 11/02*    (2006.01)
*G06T 3/00*    (2006.01)
*G06T 7/50*    (2017.01)

(52) U.S. Cl.
CPC ............ *G06T 19/20* (2013.01); *G01B 11/026* (2013.01); *G06T 3/0006* (2013.01); *G06T 7/50* (2017.01)

(58) Field of Classification Search
None
See application file for complete search history.

(56) References Cited

U.S. PATENT DOCUMENTS

| 9,392,212 | B1* | 7/2016 | Ross | G02B 27/017 |
| 2007/0248283 | A1* | 10/2007 | Mack | G06T 19/006 |
| | | | | 382/284 |
| 2011/0254861 | A1* | 10/2011 | Emura | G06F 3/0488 |
| | | | | 345/633 |
| 2015/0254905 | A1* | 9/2015 | Ramsby | G06T 19/006 |
| | | | | 345/419 |
| 2016/0210784 | A1* | 7/2016 | Ramsby | G06T 19/006 |
| 2016/0343169 | A1* | 11/2016 | Mullins | G06T 19/006 |

\* cited by examiner

*Primary Examiner* — Jason A Pringle-Parker
(74) *Attorney, Agent, or Firm* — Patterson + Sheridan, LLP

(57) ABSTRACT

Embodiments provide for distorted views in augmented reality by mapping undistorted distances from a camera to real objects in an environment; producing a distorted video feed of the environment that shows the real objects at apparent distances to the camera; anchoring a virtual object to a position in the environment based on the undistorted distances; determining a scaling factor between the camera and the position based on the undistorted distances and the apparent distances; scaling the virtual object based on the scaling factor; overlaying the virtual object as scaled into the distorted video feed; and outputting the distorted video feed to a display device.

17 Claims, 12 Drawing Sheets

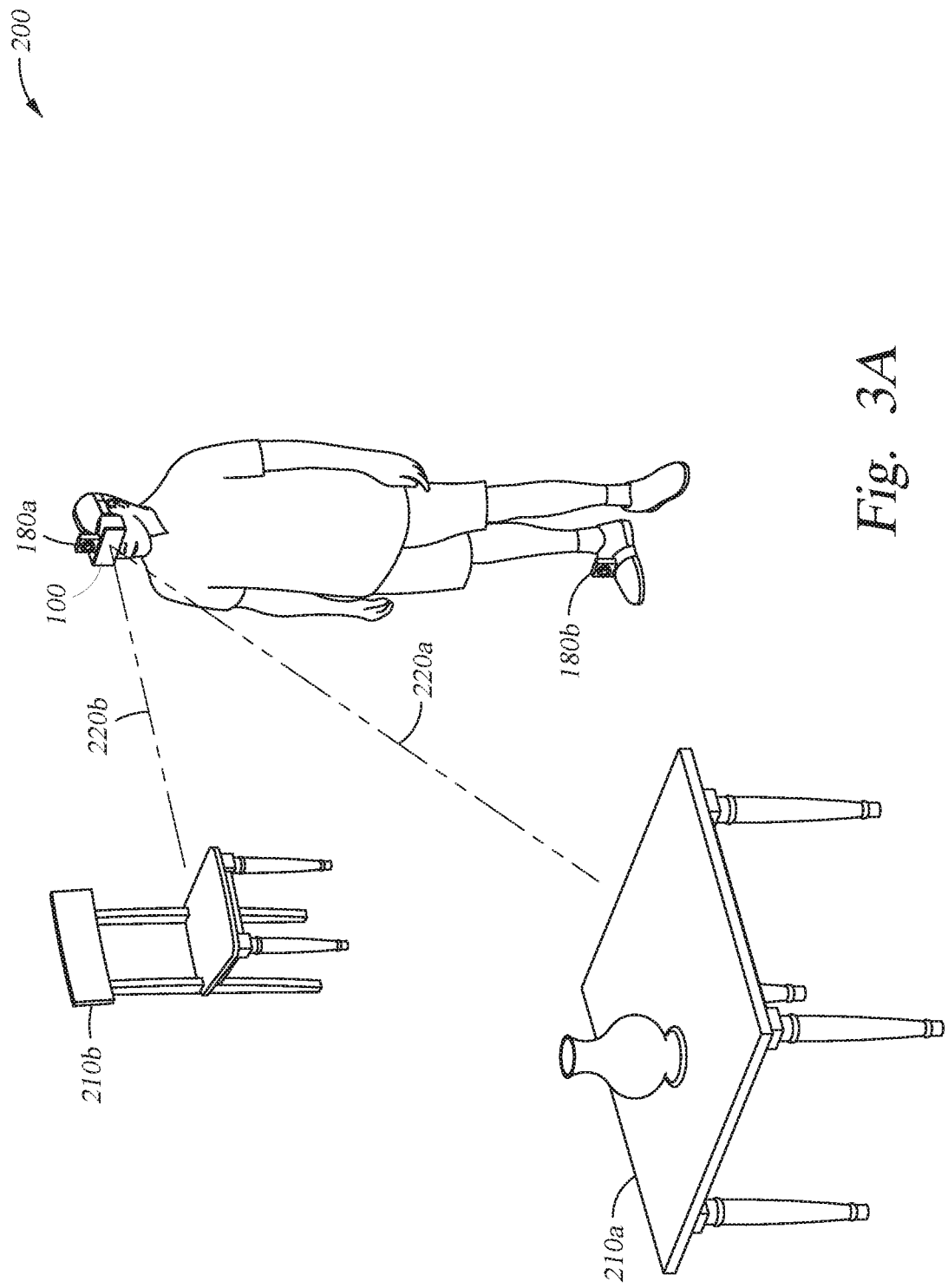

DISTORTED VIEW AUGMENTED REALITY

BACKGROUND

Augmented Reality (AR) may be realized by overlaying images of virtual objects onto an image of the real world environment including one or more real world objects. The images of virtual objects are positioned in a user's Field of View (FOV) to give the virtual objects an apparent location in the environment. To ensure that the images of the virtual objects are displayed in appropriate positions in the user's FOV relative to the viewed locations of the real world objects in the environment, various AR applications may anchor the virtual objects in the environment based on the location of one or more real world objects. When the user is presented with a distorted view of the environment, however, the AR application may have difficulty arranging virtual objects in accordance with the distorted view. As a result, the AR application may anchor and present virtual objects at positions inconsistent with the AR experience otherwise provided to the user, resulting in a degraded AR experience.

SUMMARY

The present disclosure provides, in one embodiment, a method for distorting a view in augmented reality, the method, comprising: mapping undistorted distances from a camera to real objects in an environment; producing a distorted video feed of the environment that shows the real objects at apparent distances to the camera; anchoring a virtual object to a position in the environment based on the undistorted distances; determining a scaling factor between the camera and the position based on the undistorted distances and the apparent distances; scaling the virtual object based on the scaling factor; overlaying the virtual object as scaled into the distorted video feed; and outputting the distorted video feed to a display device.

In another embodiment, the present disclosure provides a non-transitory computer-readable medium containing computer program code for distorting a view in augmented reality that, when executed by operation of one or more computer processors, performs an operation comprising: mapping undistorted distances from a camera to real objects in an environment; producing a distorted video feed of the environment that shows the real objects at apparent distances to the camera; anchoring a virtual object to a position in the environments based on the undistorted distances; determining a scaling factor between the camera and the position based on the undistorted distances and the apparent distances; scaling the virtual object based on the scaling factor; overlaying the virtual object as scaled into the distorted video feed; and outputting the distorted video feed to a display device.

In a further embodiment, the present disclosure provides a system for distorting a view in augmented reality, the system comprising: a processor; a camera; a display device; and a memory storing instructions that when executed by the processor enable the system to: map undistorted distances from the camera to real objects in an environment; produce a distorted video feed of the environment that shows the real objects at apparent distances to the camera; anchor a virtual object to a position in the environments based on the undistorted distances; determine a scaling factor between the camera and the position based on the undistorted distances and the apparent distances; scale the virtual object based on the scaling factor; overlay the virtual object as scaled into the distorted video feed; and output the distorted video feed to the display device.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 3A-D illustrate views of the environment as part of the Augmented Reality experience that be distorted for the viewer from a new perspective from what is shown in FIGS. 2A-F, according to aspects of the present disclosure.

DETAILED DESCRIPTION

The provision of Augmented Reality (AR) to a viewer in association with a distorted view of the environment as described herein may be provided by one or more systems, methods, and computer-readable media. The viewer may request a distorted view of the environment to show the environment that includes at least a portion from a perspective that is zoomed-in, zoomed-out, or has a special effect applied thereto. Any virtual objects inserted into the environment as part of the AR experience are overlaid onto the view based on an understanding of the actual environment and of the perspective provided to the viewer. As such, the viewer may be provided an AR experience that creates a forced perspective that is reinforced with virtual objects of an expected size to further emphasize the effect to the viewer and/or to protect the viewer from unintentionally interacting with real objects in the environment. For example, a perspective of an environment may be shown such that the viewer sees real objects in the environment as larger-than-normal or smaller-than-normal and virtual objects are overlaid onto the video feed of the distorted environment to hide artefacts in the video feed, to provide a point of reference to the viewer (e.g., an object of an expected size), or to keep a mobile viewer from bumping a real object that is closer than the video feed otherwise indicates or is not shown in the video feed.

Figure 1:
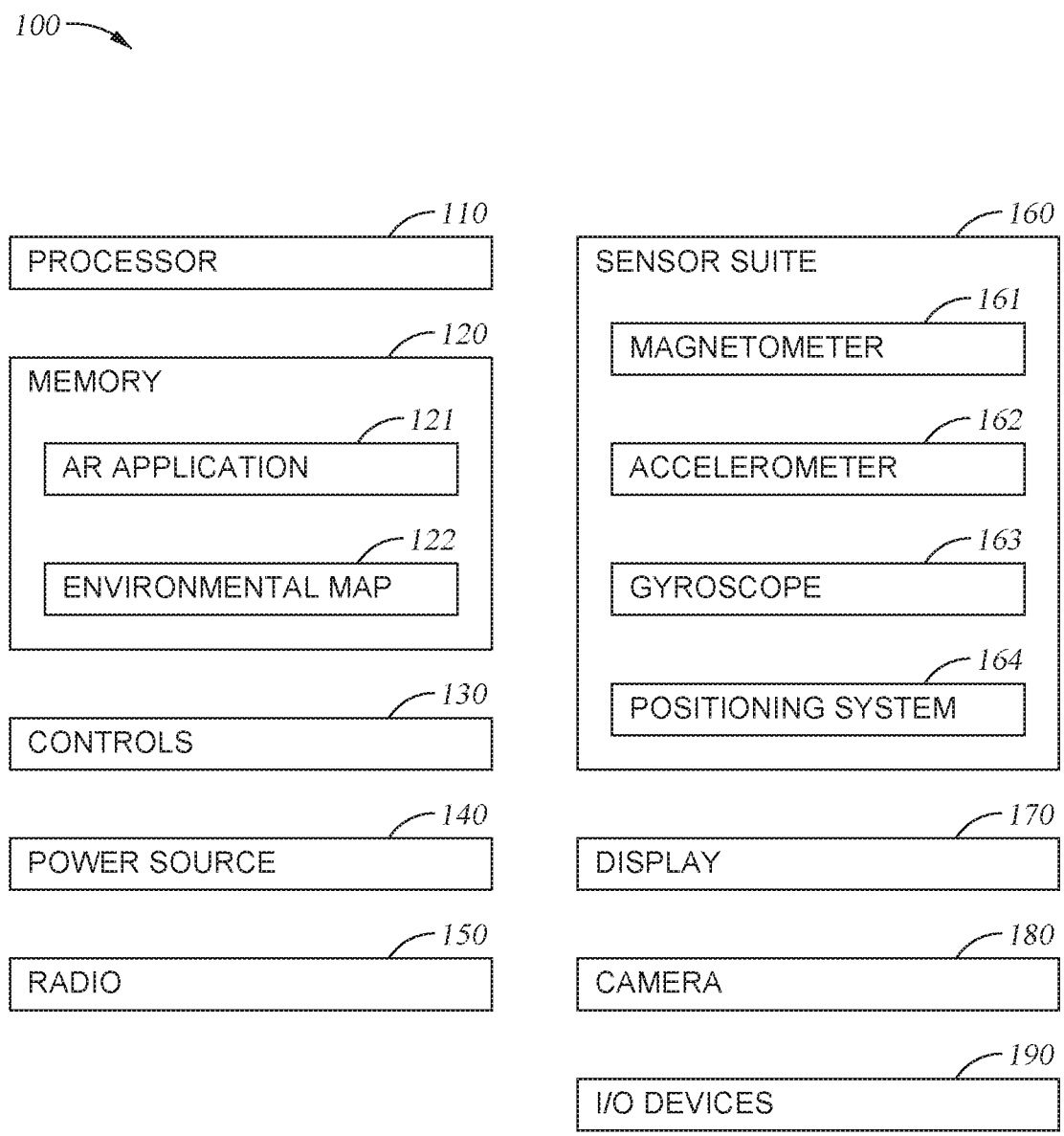
FIG. 1 illustrates an Augmented Reality device, according to aspects of the present disclosure.

FIG. 1 illustrates an AR device 100, according to aspects of the present disclosure. An AR device 100 includes a processor 110, a memory 120, and various hardware to provide a user with an AR experience. In various embodiments, the AR device 100 may be an AR headset or a general computing device (e.g., a smart phone, a tablet computer, a laptop computer) that provides an AR experience.

The processor 110 and the memory 120 provide computing functionality to the AR device 100. The memory 120 may be one or more memory devices, such as, for example, Random Access Memory (RAM), Read Only Memory (ROM), flash memory, or any other type of volatile or non-volatile storage medium that includes instructions that the processor 110 may execute. The processor 110, which may be any computer processor capable of performing the functions described herein, executes commands based on inputs received from the input controls 130.

The memory 120 generally includes program code for performing various functions related providing an AR experience to a user. The program code is generally described as various functional "applications" or "modules" within the memory 120, although alternate implementations may have different functions and/or combinations of functions. The memory 120 also generally includes data structures that may store information for use by the various program code modules also stored thereon. The memory 120 includes program code for an AR application 121 and data structures for environmental maps 122, although other applications and data structures may also be included by the memory 120.

The AR application 121 is generally configured to provide functionality to overlay virtual objects onto a video feed of the environment. In some embodiments, the code for the AR application 121 is provided to manage commands sent to and data feeds received from one or more remote devices as well as various sensors included in a sensor suite 160 of the AR device 100.

In various embodiments, the AR application 121 is provided one or more environmental maps 122 to aid in providing the AR experience to a viewer. The AR application 121 may generate or update the environmental map 122 at startup of the AR device 100 or in response to a command. Environmental maps 122 include positional data for various real and virtual objects for use in the AR experience by the AR application 121. The objects may include positional data indicated via relative coordinates (e.g., X meters from another object, in the living room, X meters from the AR device 100) and/or by absolute coordinates (e.g., at latitude X and longitude Y). Various objects may be classified and identified in the environmental map 122 (e.g., a tree, a chair, a wall, a person, etc.) via image recognition or signals transmitted by that object. Two or more environmental maps 122 may be reconciled to one another so that the AR application 121 may position virtual objects into a video feed in accordance with the distorted apparent positions and/or undistorted actual positions of the real objects in the environment.

The AR device 100 includes one or more input controls 130 to receive input from a user to thereby control the AR experience. The input controls 130 may include physical joysticks, physical steering wheels/yokes, physical buttons, physical switches, microphones, and a touch interface that designates various regions for use as virtual joysticks, buttons, switches, etc. A user may manipulate the various input controls 130 to signal the AR application 121 to alter the AR experience, shut down the AR device 100, switch to a different application, change system settings (e.g., volume, brightness), etc.

The power source 140 provides electric power to the various components of the AR device 100. Various examples of power sources 140 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 140.

The radio 150 provides wireless communications for the AR device 100. In various embodiments, the radio 150 is a transmitter/receiver, which receives signals from external sources and transmits signals to external devices. The radio 150 may be in communication with various antennas and may configure messages to be transmitted or received according to various standards, such as, Bluetooth, Wi-Fi, or a proprietary standard.

The sensor suite 160 includes a magnetometer 161, an accelerometer 162, a gyroscope 163, and a positioning system 164, among other sensors. The sensor suite 160 may include additional sensors, several instances of each sensor, or may omit some of the example sensors discussed herein. The magnetometer 161 is a sensor that provides a bearing to a north pole of a magnetic field in the environment in which the AR device 100 is present. The magnetometer 161 may thus provide the AR device 100 with a directional sense in terms of yaw orientation with respect to magnetic north. The accelerometer 162, which measures acceleration forces acting on the AR device 100, may provide the AR device 100 with information of whether the AR device 100 (or a portion thereof) is moving, and in which direction(s). The gyroscope 163 measures orientation of the AR device 100 (or a portion thereof), and may provide the AR device 100 with information of whether the AR device 100 (or portion thereof) is level or to what degree the AR device 100 is tilted in one or more planes. The combination of the accelerometer 162 and gyroscope 163 may thus provide the AR device 100 with a directional sense in terms of pitch and roll with respect to gravity. The positioning system 164 may provide absolute positioning information (e.g., via a Global Positioning System (GPS) receiver) and relative positioning information (e.g., via a range finder, a camera sensor including image recognition software to identify objects and distances thereto based on known sizes).

In some embodiments, the AR application 121 uses the sensor suite 160 to build an environmental map 122, to determine where the AR device 100 is located on an existing environmental map 122, and to identify when to display virtual objects to the user on a display 170 of the AR device 100 based on a location and orientation of the AR device 100.

The display 170 includes one or more devices used to output AR objects and/or a video feed to a user. In one example, a Liquid Crystal Display (LCD), Light Emitting Diode (LED), or other display technology is used to present a video feed into which virtual objects have been programmatically inserted or overlaid for output to the viewer. In a further example, two displays 170 are provided, one for each eye of a user, such that the viewer is provided three-dimensional virtual objects in the field of view.

One or more cameras 180 are included in the AR device 100 to provide a video feed over which virtual objects may be overlaid or into which virtual objects may be programmatically inserted. The camera 180 may be omitted or deactivated in embodiments that use an external device to provide a video feed. In various embodiments, the camera 180 is provided in conjunction with image recognition software (stored on the memory 120) to identify various real objects in the field of view, which once identified may be used by the AR application 121 for inclusion in an environmental map 122 and/or as an anchor point for a virtual object output to the viewer on the display 170.

The camera 180 may be included in the AR device 100 by wired or wireless communications so that the AR application 121 may use cameras 180 providing several perspectives. For example, Wi-Fi or Bluetooth enabled cameras 180 devices may provide additional/alternative perspectives to the AR application 121 from a camera 180 physically connected to a headset incorporating a display 170.

Each of the cameras 180 may include different lenses or virtual lenses to provide different perspectives from a single camera 180 to the AR application 121. In one example, a "natural" field of view may be set to provide a human viewer video feed output to the display 170 that matches what the viewer would see without the AR device 100. In various aspects, the natural field of view is set to include or exclude peripheral vision, or is provided with various sharpness levels within the field of view (corresponding to binocular overlap, monocular forward vision, and monocular peripheral vision).

The AR application 121 may switch between various lensing setups for the camera 180 to provide different fields of vision beyond the natural field of view to provide distorted views of the environment to the viewer. For example, a camera 180 may provide, via a first lensing setup and the display 170, a video feed with natural field of view to a viewer of approximately 70° horizontally and 70° vertically) (±10° to match a typical binocular visual field for a human without movement of head or eyes. The AR application 121 may alter the lensing setup of the camera 180 to provide a greater visual field to the viewer; condensing visual information from outside of the 70°×70° natural visual field into the video feed provided in the viewer's visual field by the display 170 in a 70°×70° field of view. In another example, the AR application 121 may alter the lensing setup of the camera 180 to provide a smaller visual field to the viewer; expanding visual information from inside of a 35°×35° subset of the 70°×70° natural visual field to fill the 70°×70° field presentation of video feed provided in the viewer's visual field by the display 170. In various embodiments, the AR camera 180 includes multiple lenses that are switched between to alter the lensing setup.

In various embodiments, the camera 180 includes a lens with a field of view greater than 70° (e.g., a wide angle lens or a 360° lens that the AR application 121) that the AR application 121 samples from to produce a distorted image of the environment. In further embodiments, the camera 180 includes a lens with a field of view less than what is shown to the viewer via the display 170, which the AR application 121 uses to collect images of the environment at a rate higher than that used in the display 170 to merge several images of the environment into a single frame for output on the display 170. The camera 180, by sampling from a lens with a wider field of view than is shown to the viewer via the display 170 (whether due to lensing setup, sampling rate, and/or display size) provides the AR application 121 with outside of the visible field of the viewer, which the AR application 121 uses to determine whether to include virtual objects.

Additional Input/Output (I/O) devices 190 may be included in various embodiments of an AR device 100. The additional I/O devices 190 may include various lights, displays, and speakers (e.g. LEDs, IR transmitter/receivers, speaker, buttons, microphones, light sensors, etc.) for providing output from the AR device 100 in addition to that provided by the display 170 and/or radio 150. For example, a speaker is an I/O device 190 that provides audio output (e.g., of an audio component of a video feed or an AR sound effect).

Figure 2A:
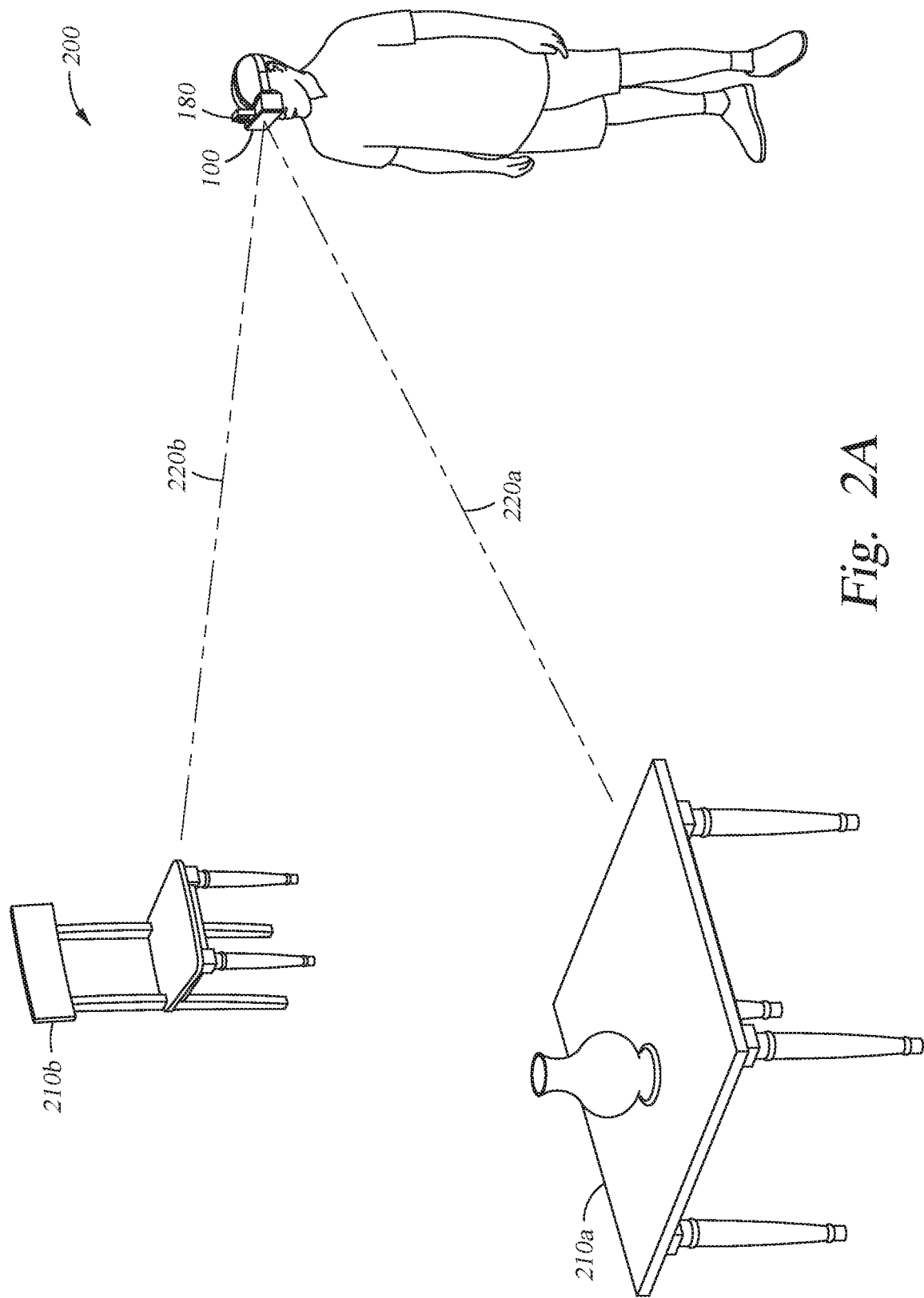
FIGS. 2A-F illustrate views of the environment as part of the Augmented Reality experience that is distorted for the viewer, according to aspects of the present disclosure.

FIGS. 2A-F illustrate views of the environment as part of the AR experience that is distorted for the viewer, according to aspects of the present disclosure. FIG. 2A illustrates of view of the environment 200 in which a viewer, using an AR device 100 with co-located camera 180, is present with a first real object 210a (generally, real object 210) and a second real object 210b. A first undistorted distance 220a (generally, undistorted distance 220) between the camera 180 and the first real object 210a and a second undistorted distance 220b between the camera 180 and the second real object 220b are shown for reference.

In various embodiments, the AR application 121 applies the distortions in the AR experience gradually; the level of distortion level shifts through several intermediary distortion levels to animate from a starting perspective to a final perspective. In other embodiments, the AR application 121 applies the distortions suddenly in the AR experience; the distortion shifts directly from a starting perspective to a final perspective. In some embodiments in which a distortion is suddenly applied, an animation or transformation effect (e.g., a shimmer, a flash, a countdown, a blank screen) is overlaid into the video feed between display of the environment 200 according to the first perspective and the final perspective to ready the viewer for the different view of the environment 200.

Figure 2B:
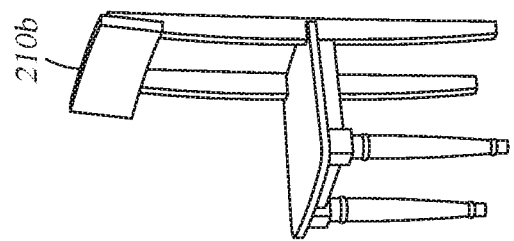
Figure 2B:
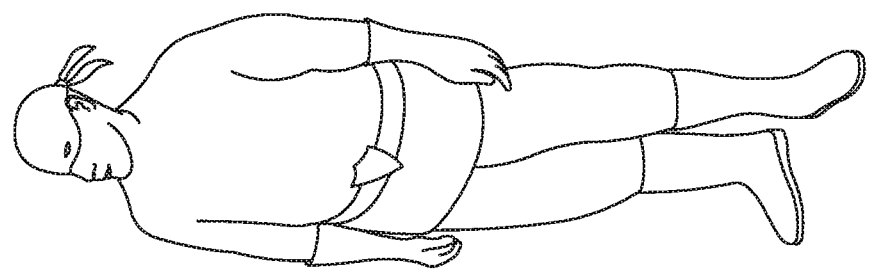
Figure 2B:
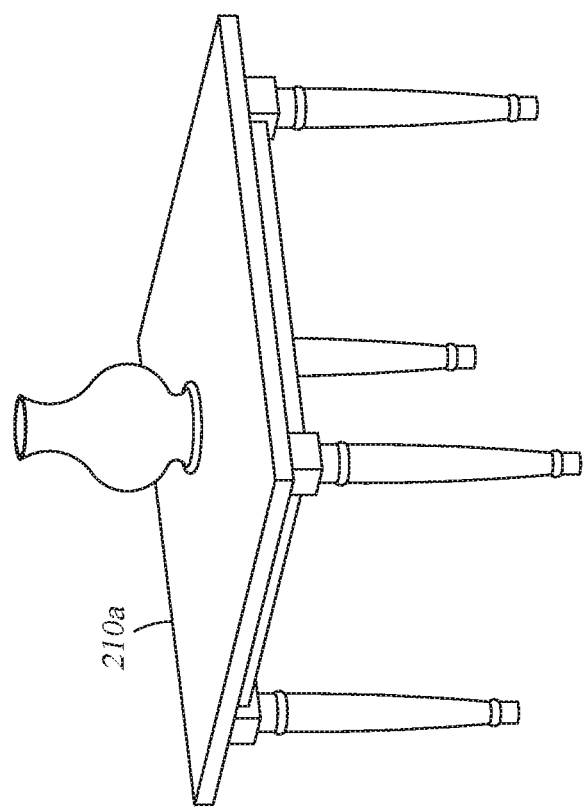

FIG. 2B illustrates an example of a natural field of view of the environment 200 overlaid with a virtual object 230. The natural field of view of FIG. 3B, but for the virtual object 230, represents what the viewer would see if the viewer's eyes were located where the camera 180 is located. The virtual object 230 may be anchored in the environment 200 at a position indicated in the environmental map 122 based on the locations of the first real object 210a and/or the second real object 210b. The AR application 121 scales the apparent size at which the virtual object 230 is presented at to match the sizes of real objects 210 based on the distance to the position where the virtual object 230 is located in the environment 200. For example, the AR application 121 scales the illustrated superhero to appear a certain size that corresponds to the distance away from the point where that superhero is located. If the superhero were anchored at a position closer to the viewer, the AR application 121 would scale the superhero to appear larger, and if the superhero were anchored at a position further away from the viewer, the AR application 121 would scale the superhero to appear smaller.

Figure 2C:
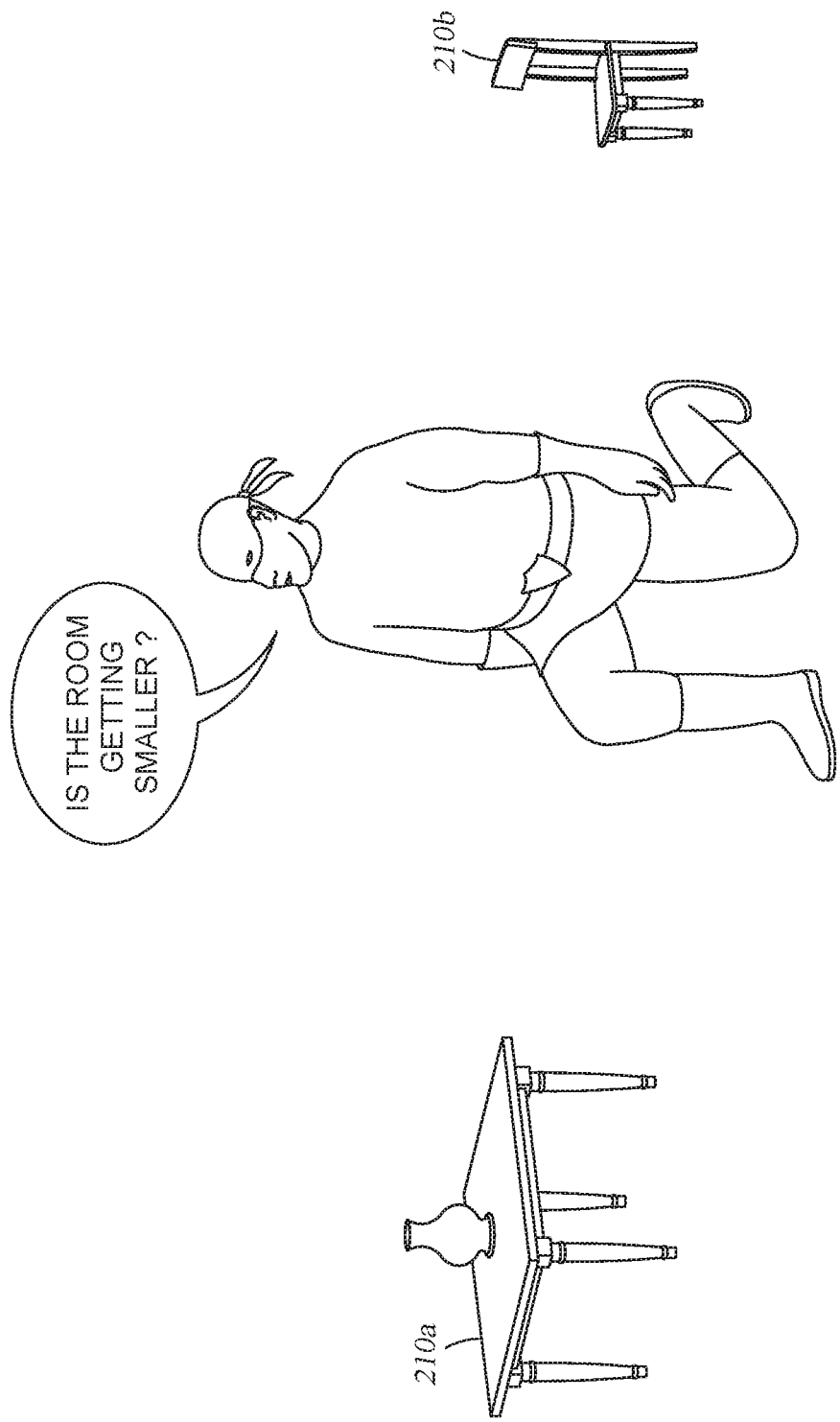

FIG. 2C illustrates an example of a distorted field of view of the environment 200 that is distorted in a video feed to show real objects 210 at apparent distances/perspectives that are further away from the viewer than the undistorted distances. For example, FIG. 2C may illustrate a distortion in an AR experience from that illustrated in FIG. 2B where the user grows larger or the room shrinks in the viewer's perspective.

Figure 2D:
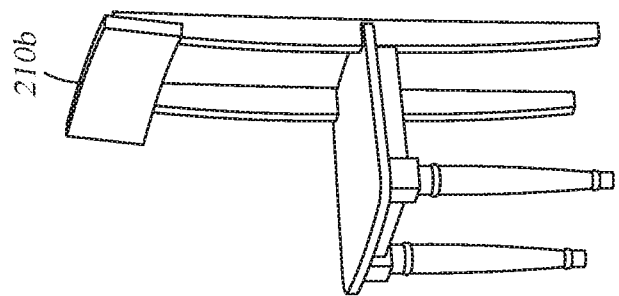
Figure 2D:
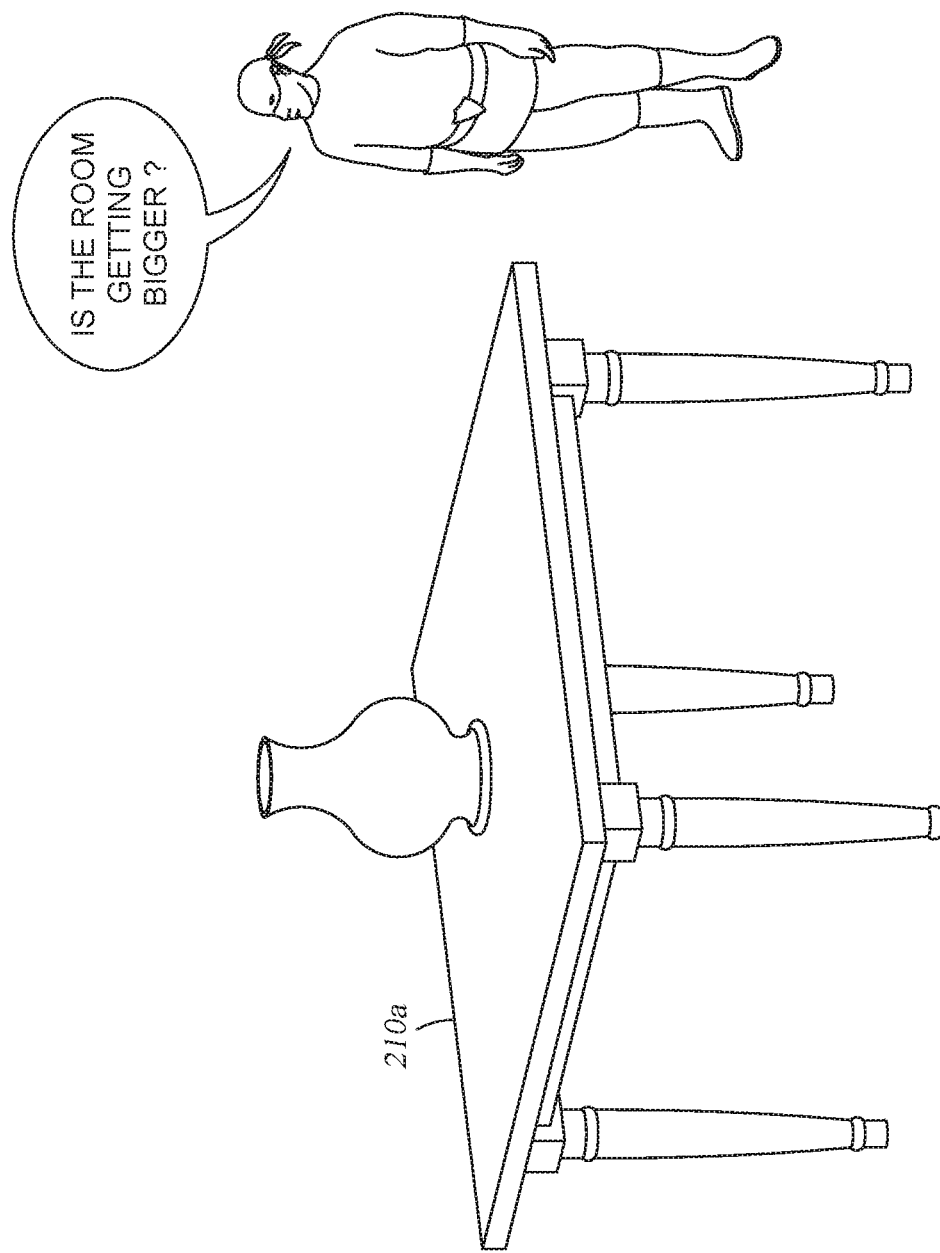

FIG. 2D illustrates an example of a distorted field of view of the environment 200 that is distorted in a video feed to show real objects 210 at apparent distances/perspectives that are closer to the viewer than the undistorted distances. For example, FIG. 2D may illustrate a distortion in an AR experience from that illustrated in FIG. 2B where the user shrinks or the room grows larger in the viewer's perspective.

Figure 2E:
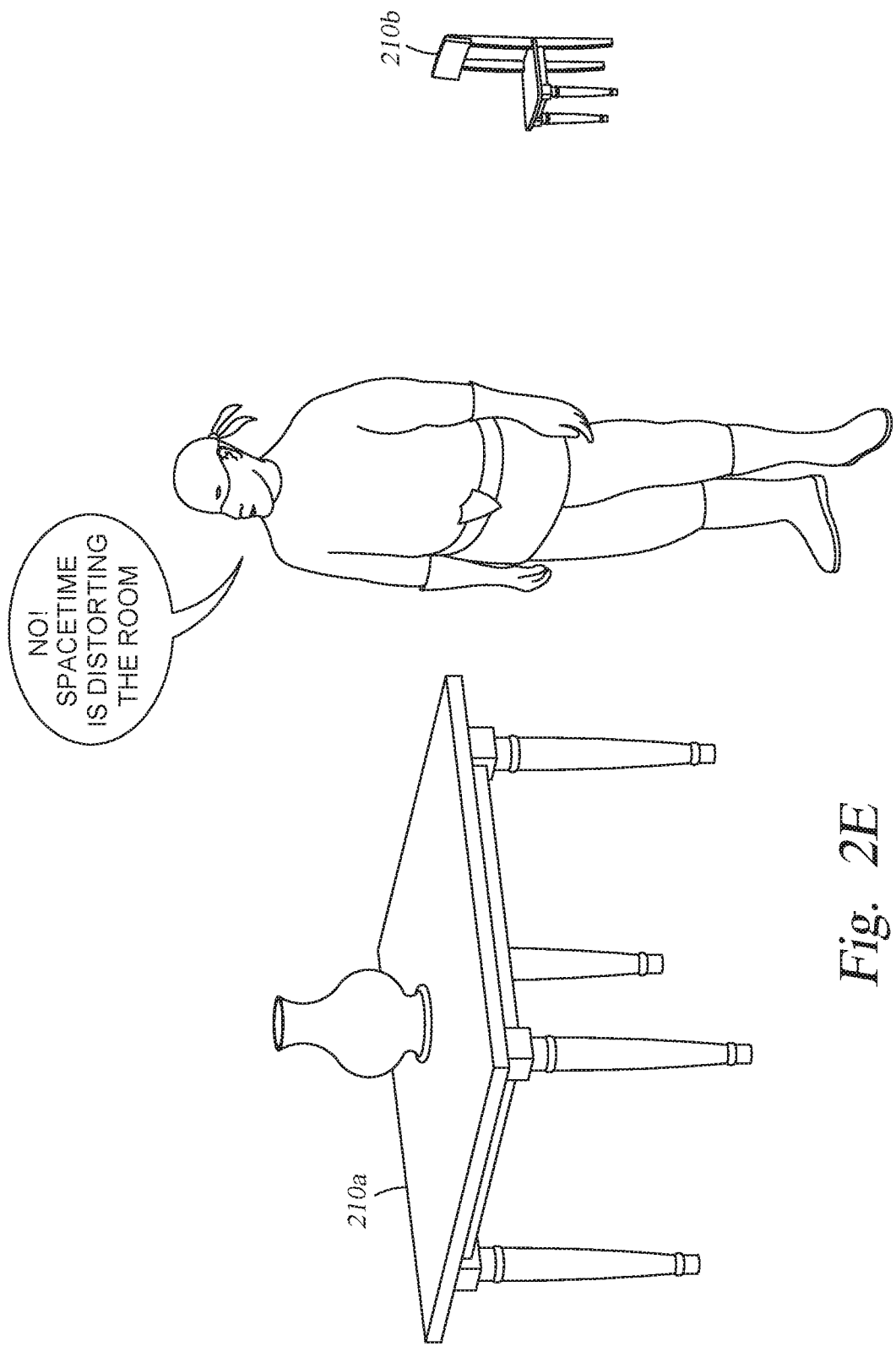

FIG. 2E illustrates an example of a distorted field of view of the environment 200 that is distorted in a video feed to show some real objects 210 at apparent distances/perspectives that are closer to the viewer than the undistorted distances and other real objects 210 at apparent distances/ perspectives that a further from the viewer than the undistorted distances. For example, FIG. 2E may illustrate a distortion in an AR experience from that illustrated in FIG. 2B where space is being warped in which some parts of the room grow larger and others smaller in the viewer's perspective. AR objects 230, such as the first AR object 210a of the character may be positioned in a transition region between two or more distortion levels (e.g., the growth distortion of the first real object 210*a* and the shrinking of the second real object 210*b*) to mask the transition region from the viewer when overlaid in the video feed.

Each of the virtual objects 230 provided in the AR experience may be adjusted in various ways to consistently work with the distortion effect applied to the environment. For example, the first virtual object 230*a* of the character from FIG. 2B is shown in FIG. 2C at the same size and location in the environment 200 to also be growing larger with the user or otherwise unaffected by the cause shrinking the room in the AR experience. The character may be reoriented (e.g., to a sitting posture versus a standing posture) or repositioned to appear at a consistent size and location in the environment 200 to the viewer. For example, the first virtual object 230*a* may be anchored at a position halfway between the first real object 210*a* and the second real object 210*b*, and as the apparent distances between the real objects 210 increase, the first virtual object 230*a* is repositioned to remain centered between the two real objects 210. In another example, the second virtual object 230*b* of the vase from FIG. 2B is shown in FIG. 2C as "shrinking" proportionally with the real objects 210. The scaling factor applied to the second virtual object 230*b* is consistent with how the surrounding real objects 210 in the region in which the second virtual object 230*b* is positioned are scaled according to the distortion level.

Figure 2F:
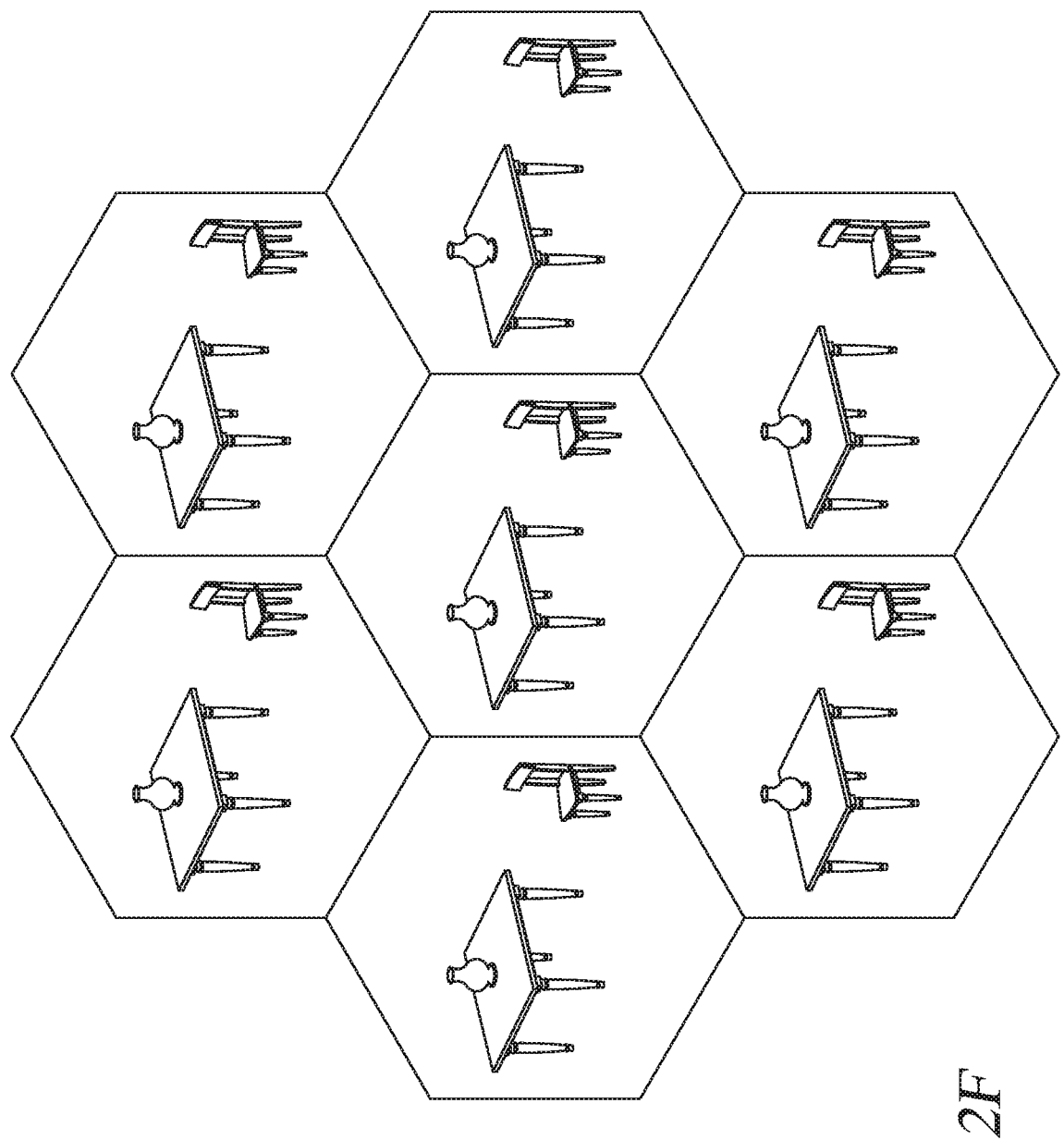

FIG. 2F illustrates an example of a special effect distortion of a kaleidoscopic or "bug's-eye" view of the environment 200. The AR application 121 may sample an image of the environment 200 and tile the image into the output for the display 170 to provide several views of the environment 200 simultaneously to the viewer. Other examples of special effect distortions include, but are not limited to: time travel/motion blur, in which images captured at an earlier time are co-displayed with images captured at a later time, sometimes with a transparency increasing over time to show a user a motion trail behind and object or several time-shifted views of the environment 200; color shift, in which the color balance of some or a portion of each image in a frame is adjusted; picture-in-picture view, in which a first perspective of the environment 200 is shown in a first designated portion of the display 170 to the viewer concurrently with a second perspective of the environment 200 being shown in a second designated portion of the display 170; an augmented three-dimensional view, in which two cameras 180 provide two different perspectives to the two eyes of a viewer with a greater distance between the two cameras 180 than the distance between the eyes of the viewer; etc.

Figure 3B:
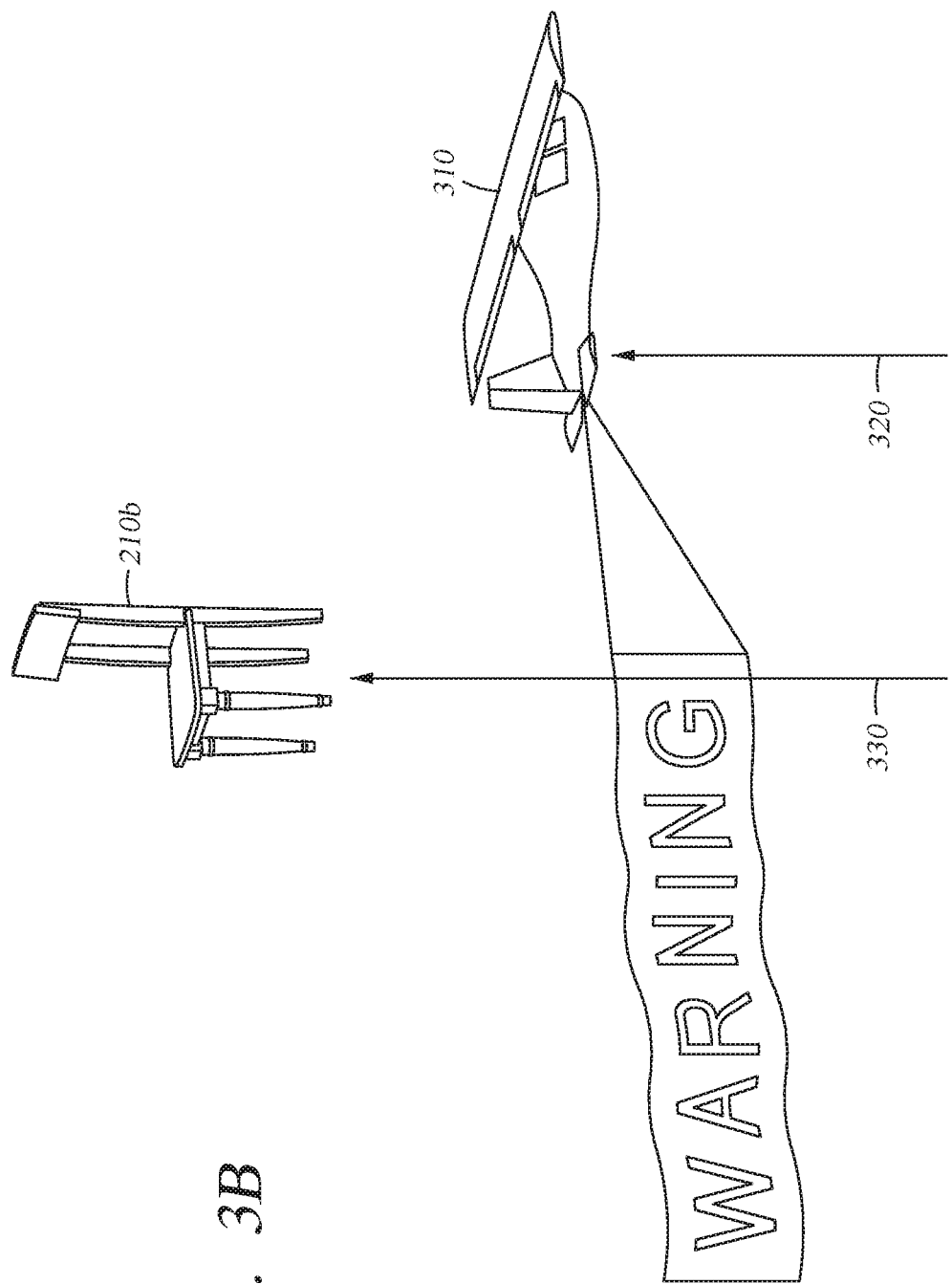

FIGS. 3A-D illustrate views of the environment as part of the AR experience that is distorted for the viewer from a new perspective from what is shown in FIGS. 2A-F, according to aspects of the present disclosure. FIG. 3A illustrates of view of the environment 200 in which a viewer, using an AR device 100 with co-located first camera 180*a* and a foot-mounted second camera 180*b*, is present with a first real object 210*a* and a second real object 210*b*. A fourth undistorted distance 220*d* between the first camera 180*a* and the first real object 210*a* and a third undistorted distance 220*c* between the first camera 180*a* and the second real object 220*b* are shown for reference, which show that the viewer has moved closer to the second real object 220*b* than is shown in FIG. 2A. As the viewer moves in the environment 200, different real objects 210 may enter or leave the field of view of the viewer. For example, because the viewer has moved closer to the second real object 210*b*, the first real object 210*a*, the first virtual object 230*a*, and the second virtual object 230*b* are not visible to the viewer in some embodiments.

FIG. 3B illustrates an example of a distorted field of view of the environment 200 that is distorted in a video feed to show real objects 210 at apparent distances/perspectives that are further away from the viewer than the undistorted distances. For example, FIG. 3B illustrates a distortion in an AR experience similar to that shown in FIG. 2C, but from the viewer's new location in the environment 200. FIG. 3B shows the apparent distance 330 to the viewer of the second real object 210*b*, and an alerting virtual object 310 associated with the second real object 210*b*. The alerting virtual object 210 is displayed in the distorted video feed at an apparent distance 320 that corresponds to the undistorted distance 220*c* of the second virtual object 210*b* so that, for example, the viewer will be alerted that the second real object 210*b* is closer than appearances otherwise indicate. The alerting virtual object 310 may be matched with the theme of the AR experience so that the viewer is provided an alerting virtual object 310 of a biplane in a first AR scenario and an alerting virtual object 310 of a rocket ship, a dragon, or a pterodactyl in a second AR scenario.

Figure 3C:
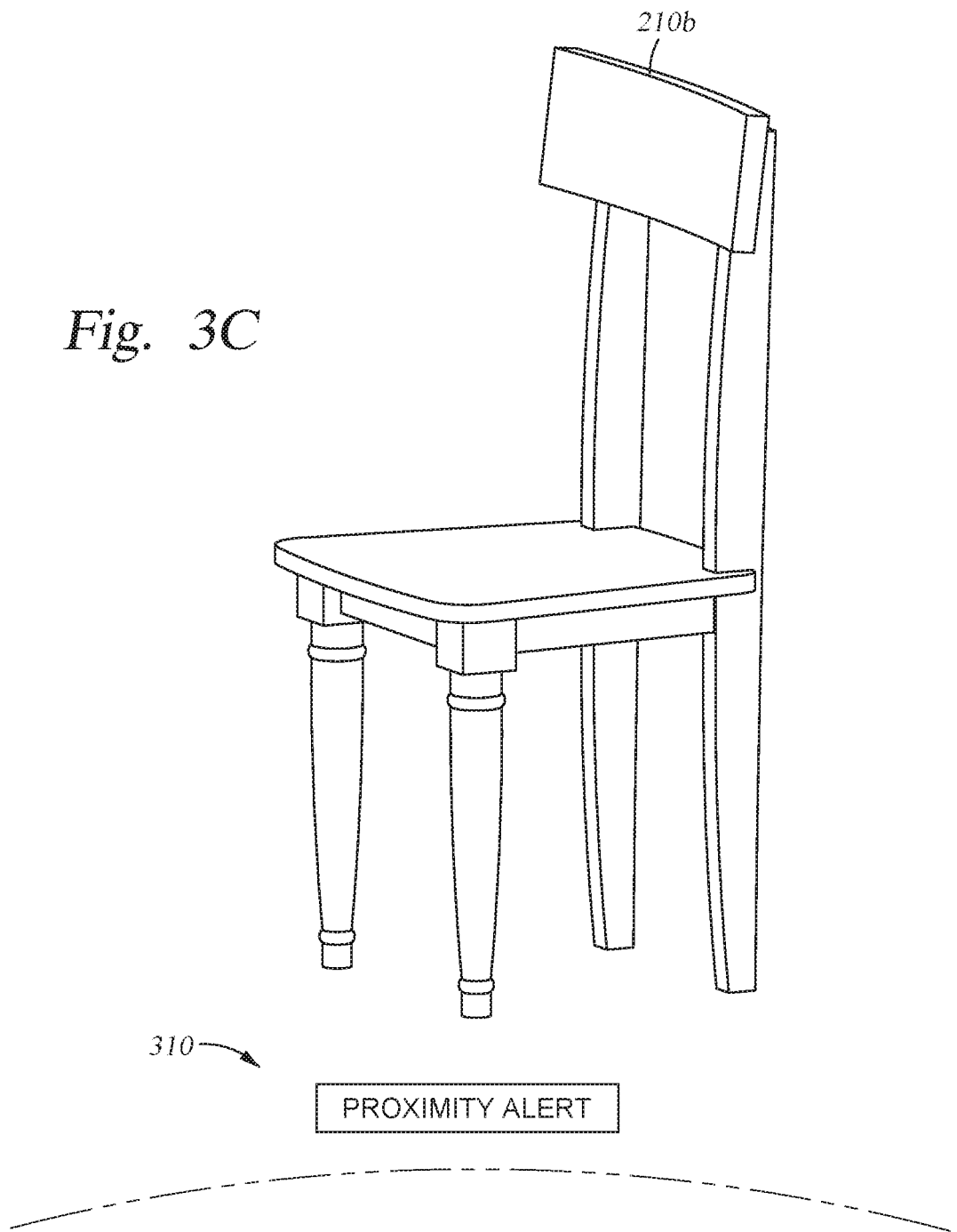

FIG. 3C illustrates an example of a distorted field of view of the environment 200 that is distorted in a video feed to show real objects 210 at apparent distances/perspectives that are closer to the viewer than the undistorted distances. For example, FIG. 3C illustrates a distortion in an AR experience similar to that shown in FIG. 2D, but from the viewer's new location in the environment 200. Because the perspective illustrated in FIG. 3C expands a portion of the visual field for the viewer into the available display area in the display 170, some real objects 210 that would be visible to the viewer if not viewing the environment through the display 170 may be absent from the display 170, but visible to one or more cameras 180 in the environment 200. Therefore, the AR application 121 may overlay an alerting virtual object 310 that is associated with an obscured real objet 210 into the video feed.

In the illustrated example of FIG. 3C, the alerting virtual object 310 is shown in the lower portion of the visual field of the display 170, corresponding to a real object 210 that may be underfoot to the viewer, but the alerting virtual object 310 may be shown in other portions of the visual field of the display 170 in other aspects. For example, if a real object 210 is within a predefined undistorted distance to the left of the viewer and is not visible in the display 170 (e.g., due to the distortion), the AR application 121 may overlay an alerting virtual object 310 of the left portion of the visual display.

An alerting virtual object 310 may be anchored at a position in the environment such that the AR application 121 displays the alerting virtual object 310 at an apparent distance from the viewer that corresponds to the undistorted distance to the viewer. In various embodiments, the AR application 121 does not overlay the alerting virtual object 310 into the distorted video feed until the viewer is within a predefined (undistorted) distance of the corresponding real object 210.

Figure 3D:
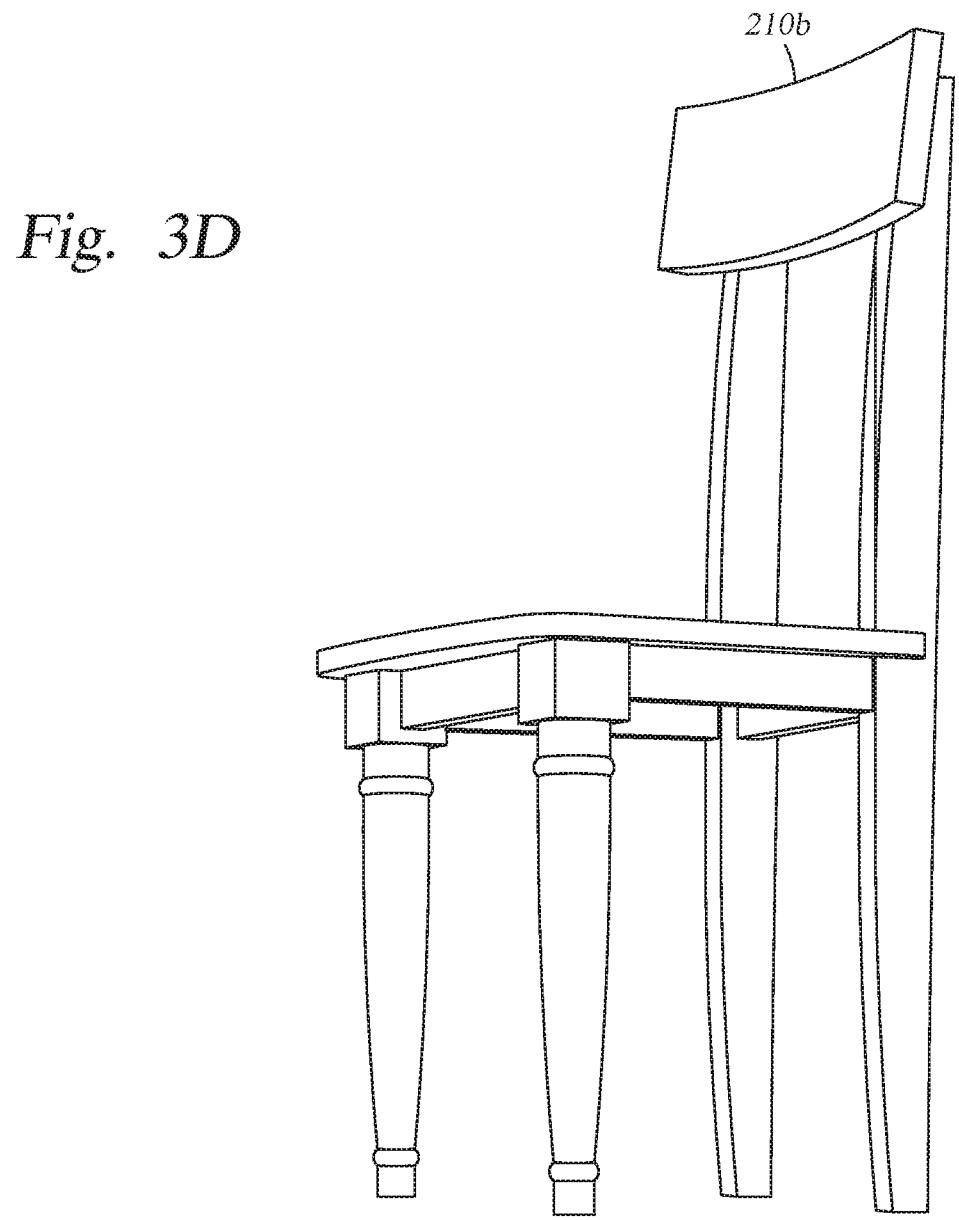

FIG. 3D illustrates a viewpoint from an alternative camera 180 than shown in FIG. 3B or 3C. For example, video information from a second camera 180*b* may be used in place of or in cooperation with data from the first camera 180*a* to provide a distorted view of the environment. The AR application 121 may merge images from two or more cameras 180 together to provide a distorted view including imaging information from the two or more cameras 180 at one time in a display 170. For example, the AR application 121 may transition from the first camera 180a mounted near a viewer's head to a second camera 180b mounted near a viewer's foot via a morph animation. In another example, the AR application 121 may show images from two cameras 180 simultaneously to provide a special effect distortion of a Cubist view of a real object 210 from multiple perspectives simultaneously.

Figure 4:
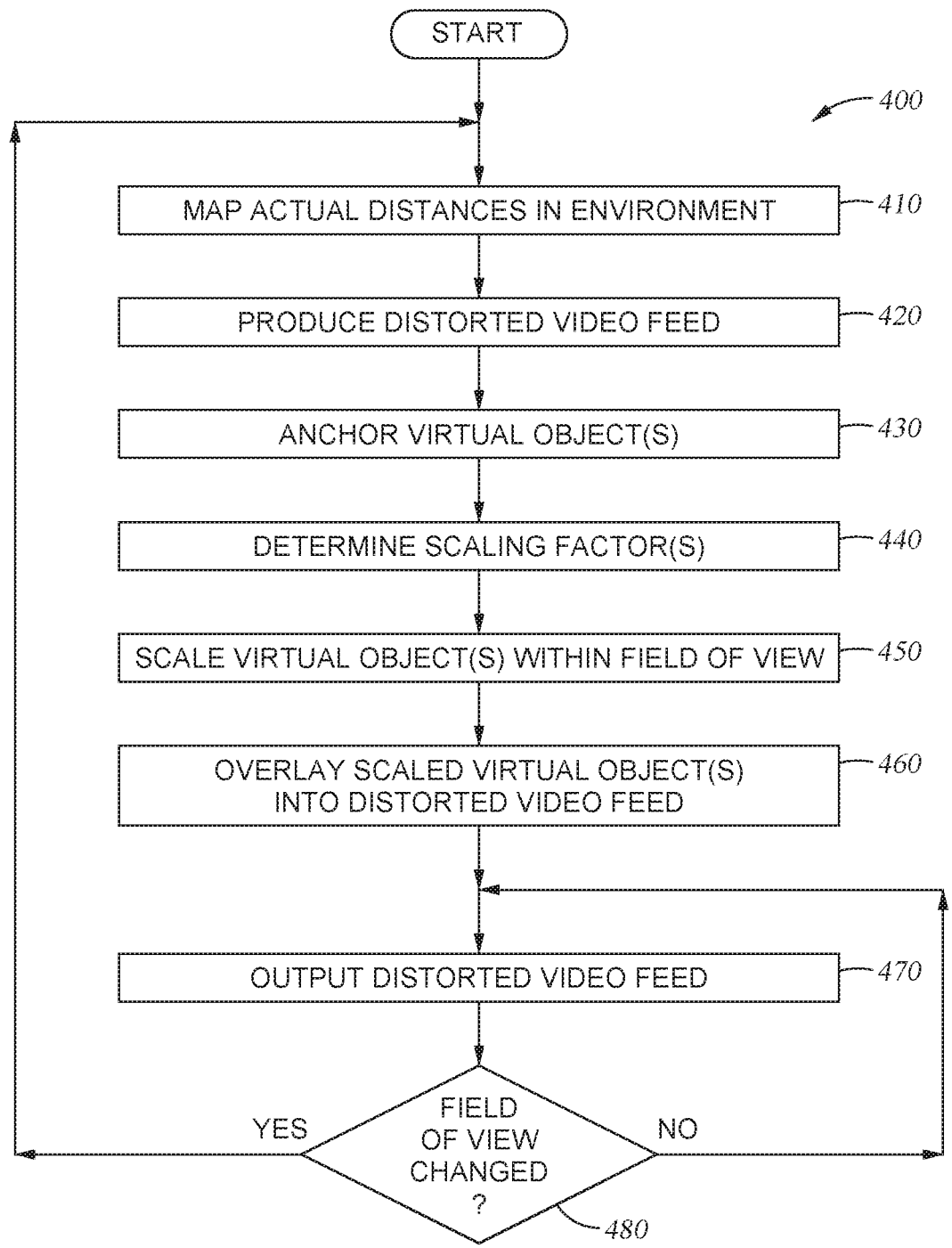
FIG. 4 is a flowchart of a method for providing an Augmented Reality experience with a distorted view of the environment, according to aspects of the present disclosure.

FIG. 4 is a flowchart of a method 400 for providing an AR experience with a distorted view of the environment, according to aspects of the present disclosure. Method 400 begins with block 410, where the AR application 121 maps undistorted distances to one or more real objects 210 in the environment 200. In various embodiments, the AR application 121 identifies various real objects 210 in the environment 200 via image recognition software applied to an image of the environment 200. In some embodiments, the AR application 121 identifies the undistorted distances 220 based on the size of the real objects 210 in the image, while in some embodiments, the AR application 121 uses data supplied by a range finder from a positioning system 164 to identify the undistorted distance 220. The identified real objects 210 and undistorted distances 220 may be stored in an environmental map 122.

At block 420, the AR application 121 produces a distorted video feed of the environment. In various embodiments, the AR application 121 may select various distortions to apply to the video feed of the environment that correspond to one or more lensing configurations for a camera 180 from which the video feed is captured. For example, the distortion may be a zoomed in view of the environment 200, in which one or more real objects 210 appear closer to the viewer than the undistorted distances 220 of those real objects 210. In another example, the distortion may be a zoomed out view of the environment 200, in which one or more real objects 210 appear further away from the viewer than the undistorted distances 220 of those real objects 210. In another example, the AR application 121 may select a warped distortion, in which some real objects 210 appear closer and some real objects 210 appear further away from the viewer than the undistorted distances 220 to those real objects 210. The AR application 121 may select a special effect distortion to align two or more images of the environment 200 (captured simultaneously or at different times) to be provided concurrently to the viewer via the display 170.

At block 430, the AR application 121 anchors a virtual object 230 at a position in the map of the environment 200 based on the locations of one or more real objects 210 and the determined undistorted distances 220 to those real objects 210. For example, a virtual object 230 for warning the viewer of the presence of real objects 210 within the AR experience may be anchored at a position such that the virtual object will be displayed in the distorted video feed to alert the user of the presence of real objects 210 despite those real objects 210 not being displayed in the distorted video feed. In another example, a virtual object 230 for warning the viewer of the undistorted location of a particular real object 210 may be displayed at an apparent distance from the viewer that corresponds to the undistorted distance of the associated real object 210. In a further example, the AR application 121 anchors a virtual object 230 at a position relative to one or more real objects 210 for co-display with the real objects 210 in the output region of the environment 200 included in the distorted video feed.

At block 440, the AR application 121 determines a scaling factor used in the distorted view of the environment based on the differences between the undistorted distances and the apparent distances to the various identified real object 210. For example, an apparent distance of X meters to a particular real object 210 and an undistorted distance of 2X meters to that particular real object 210 in the distorted video feed may indicate a scaling factor of 1:2. In another example, an apparent distance of 2Y meters to a particular real object and an undistorted distance of Y meters to that particular real object 210 in the distorted video feed may indicate a scaling factor of 2:1. It will be appreciated that with different lensing configurations that one or more scaling factors may be present in different regions of a video provided for a distorted AR experience. For example, a fisheye lens used to provide a distorted image as part of the video feed may provide different scaling factors closer to the center of the image than further from the center of the image. The AR application 121 therefore determines various scaling factors for various regions of the image captured by the camera 180.

At block 450, the AR application 121 scales the virtual object 230 based on the undistorted distance between the camera(s) 180 and the position of the virtual object 230 anchored in the environment 200, and consequently, where the virtual object 230 is located in the field of view output on the display 170 to the viewer. The AR application 121 determines based on the orientation of the camera 180 in the environment 200 and the anchored position of the virtual object 230 in the environment 200 whether to include some or all of the virtual object 230 in the video feed, and which scaling factor(s) to apply to the size of the virtual object 230 to present a consistent view of the virtual object 230 in the environment 200. In various embodiments, AR application 121 scales the virtual object 230 to increase or decrease the apparent size of the virtual object 230 relative to the distorted real objects 210 in the video feed. In some embodiments, the AR application 121 maintains the size of the virtual object 230 as the apparent sizes of the real objects 210 are increased or decreased to provide a sense of scale to the viewer.

At block 460, the AR application 121 overlays the virtual object 230, as scaled, into the distorted video feed. The AR application 121 may select to adjust the position and orientation of the virtual object 230 as the apparent size of the environment 200 or the virtual object 230 changes. For example, in an environment 200 of a room seen to be "shrinking" in a distorted video feed (in which the AR application 121 includes more image information into the field of view output to the display 170 and the apparent distances to real objects 210 is greater than the undistorted distances to those real objects 210), a virtual object 230 of a character may be seen to shift orientation to "fit" in the room; moving from a standing orientation to a sitting orientation, displaying portions of the character that were virtually obscured by various real objects 210, etc.

At block 470, the AR application 121 outputs the distorted video feed for display to the viewer on the display 170. In various embodiments, the AR application 121 formats the distorted video feed based on the display area available on the display 170, and may overlay other virtual objects or User Interface elements for display in the distorted video feed, which may be distorted or remain a consistent size regardless of the distortion level applied by the AR application 121. The AR application 121 may output individual frames of the distorted video feed to the display 170 in a content stream, which may be cached for error correction, saved for later playback in addition to current provision to the viewer, or broadcast to another device. The AR application 121 may provide frames as I-frames, B-frames, or P-frames in interlaced or progressive scan modes based on viewer preferences and hardware capabilities.

At block 480, the AR application 121 determines whether the field of view of the environment 200 for the viewer has changed. The viewer may change a field of view by moving in the environment 200; panning, zooming, or tilting (via yaw, pitch, or roll) a camera 180 providing the video feed; requesting a different distortion effect to be applied to the environment 200; switching cameras 180 used to provide the video feed; etc. The AR application 121 may determine that the viewer has changed the field of view in response to identifying software commands to alter the field of view or in response to positional information provided by a sensor suite 160 indicating that a location and/or orientation of the camera 180 in the environment 200 has changed.

In response to determining that the field of view has not changed, the AR application 121 may continue providing a video feed of the environment as currently seen by the viewer by returning to block 470.

In response to determining that the field of view has changed, the AR application 121 may return to block 410 to re-map new undistorted distances from the camera 180 to the real objects 210 in the environment 200 and re-anchor the virtual object 230 to the position in the environments based on the new undistorted distances and apparent distances to the real objects 210 based on the new field of view.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A, B, and C," it will be understood that the described embodiments include example exclusively with element A, exclusively with element B, exclusively with element C, and with any combination of elements A, B, and C. Furthermore, although some embodiments may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart illustrations and/or block diagram block or blocks.

The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowchart illustrations and/or block diagram block or blocks.

The flowchart illustrations and block diagrams in the Figures illustrate the architecture, functionality, and operation of possible implementations of systems, methods and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   mapping undistorted distances from a camera to real objects in an environment;
   producing a distorted video feed of the environment that shows the real objects at apparent distances to the camera;
   anchoring a virtual object to a position in the environment based on the undistorted distances;
   determining a scaling factor between the camera and the position based on the undistorted distances and the apparent distances;
   scaling the virtual object based on the scaling factor;
   overlaying the virtual object as scaled into the distorted video feed;
   outputting the distorted video feed to a display device; and
   in response to determining that a field of view of the environment for the camera has changed:
      mapping new undistorted distances from the camera to the real objects in the environment;
      producing the distorted video feed of the environment to show the real objects at new apparent distances to the camera;
      re-anchoring the virtual object to the position in the environment based on the new undistorted distances;
      determining a new scaling factor between the camera and the position based on the new undistorted distances and the new apparent distances;
      re-scaling the virtual object based on the new scaling factor;
      overlaying the virtual object as newly scaled into the distorted video feed; and
      outputting the distorted video feed to the display device.

2. The method of claim 1, wherein producing the distorted video feed shows a given real object at a given apparent distance less than a corresponding undistorted distance for the given real object.

3. The method of claim 2, wherein the virtual object corresponds to a second real object that is not displayed in the distorted video feed and the position corresponds to the corresponding undistorted distance for the given real object.

4. The method of claim 1, wherein producing the distorted video feed shows a given real object at a given apparent distance greater than a corresponding undistorted distance for the given real object.

5. The method of claim 4, wherein the virtual object corresponds to the given real object and the position overlays the virtual object into the distorted video feed at a virtual perceived distance corresponding to the given undistorted distance for the given real object.

6. The method of claim 1, wherein the distorted video feed includes multiple images of the environment concurrently for output.

7. A non-transitory computer-readable medium containing computer program code that, when executed by operation of one or more computer processors, performs an operation comprising:
   mapping undistorted distances from a camera to real objects in an environment;
   producing a distorted video feed of the environment that shows the real objects at apparent distances to the camera;
   anchoring a virtual object to a position in the environments based on the undistorted distances;
   determining a scaling factor between the camera and the position based on the undistorted distances and the apparent distances;
   scaling the virtual object based on the scaling factor;
   overlaying the virtual object as scaled into the distorted video feed;
   outputting the distorted video feed to a display device; and
   in response to determining that a field of view of the environment for the camera has changed:
      mapping new undistorted distances from the camera to the real objects in the environment;
      producing the distorted video feed of the environment to show the real objects at new apparent distances to the camera;
      re-anchoring the virtual object to the position in the environments based on the new undistorted distances;
      determining a new scaling factor between the camera and the position based on the new undistorted distances and the new apparent distances;
      re-scaling the virtual object based on the new scaling factor;
      overlaying the virtual object as newly scaled into the distorted video feed; and
      outputting the distorted video feed to the display device.

8. The non-transitory computer-readable medium of claim 7, wherein producing the distorted video feed shows a given real object at a given apparent distance less than a corresponding undistorted distance for the given real object.

9. The non-transitory computer-readable medium of claim 8, wherein the virtual object corresponds to a second real object that is not displayed in the distorted video feed and the position corresponds to the corresponding undistorted distance for the given real object.

10. The non-transitory computer-readable medium of claim 7, wherein producing the distorted video feed shows a given real object at a given apparent distance greater than a corresponding undistorted distance for the given real object.

11. The non-transitory computer-readable medium of claim 10, wherein the virtual object corresponds to the given real object and the position overlays the virtual object into the distorted video feed at a virtual perceived distance corresponding to the given undistorted distance for the given real object.

12. The non-transitory computer-readable medium of claim 7, wherein the distorted video feed includes multiple images of the environment concurrently for output.

13. A system, comprising:
    a processor;
    a camera;
    a display device; and
    a memory storing instructions that when executed by the processor enable the system to:

map undistorted distances from the camera to real objects in an environment;

produce a distorted video feed of the environment that shows the real objects at apparent distances to the camera;

anchor a virtual object to a position in the environments based on the undistorted distances;

determine a scaling factor between the camera and the position based on the undistorted distances and the apparent distances;

scale the virtual object based on the scaling factor;

overlay the virtual object as scaled into the distorted video feed;

output the distorted video feed to the display device; and in response to determining that a field of view of the environment for the camera has changed:
 map new undistorted distances from the camera to the real objects in the environment;
 produce the distorted video feed of the environment to show the real objects at new apparent distances to the camera;
 re-anchor the virtual object to the position in the environments based on the new undistorted distances;
 determine a new scaling factor between the camera and the position based on the new undistorted distances and the new apparent distances;
 re-scale the virtual object based on the new scaling factor;
 overlay the virtual object as newly scaled into the distorted video feed; and
 output the distorted video feed to the display device.

14. The system of claim 13, wherein producing the distorted video feed shows a given real object at a given apparent distance less than a corresponding undistorted distance for the given real object.

15. The system of claim 14, wherein the virtual object corresponds to a second real object that is not displayed in the distorted video feed and the position corresponds to the corresponding undistorted distance for the given real object.

16. The system of claim 13, wherein producing the distorted video feed shows a given real object at a given apparent distance greater than a corresponding undistorted distance for the given real object.

17. The system of claim 16, wherein the virtual object corresponds to the given real object and the position overlays the virtual object into the distorted video feed at a virtual perceived distance corresponding to the given undistorted distance for the given real object.

* * * * *